US012617230B2

(12) United States Patent
Morello et al.

(10) Patent No.: US 12,617,230 B2
(45) Date of Patent: May 5, 2026

(54) INTEGRATED HUB BEARING UNIT

(71) Applicant: AKTIEBOLAGET SKF, Gothenburg (SE)

(72) Inventors: Fausto Morello, Sommariva del Bosco (IT); Pruthviraj Mandya Shekar, Mandya (IN); Laura Baracco, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 290 days.

(21) Appl. No.: 18/487,346

(22) Filed: Oct. 16, 2023

(65) Prior Publication Data

US 2024/0159270 A1 May 16, 2024

(30) Foreign Application Priority Data

Nov. 11, 2022 (IT) ........................ 102022000023265

(51) Int. Cl.
B60B 27/00 (2006.01)
B60B 3/14 (2006.01)

(52) U.S. Cl.
CPC ...... B60B 27/0005 (2013.01); B60B 27/0042 (2013.01); B60B 27/0078 (2013.01);
(Continued)

(58) Field of Classification Search
CPC ... B60B 3/142; B60B 3/165; B60B 2310/305; B60B 2380/12; F16B 39/026; F16B 39/22; F16C 19/18; F16C 35/063; F16C 2326/02; F16D 2003/22326; Y10S 464/904; Y10S 464/905; Y10S 464/906
(Continued)

(56) References Cited

U.S. PATENT DOCUMENTS

| | | | | |
|---|---|---|---|---|
| 9,259,962 | B2 * | 2/2016 | Falsetti | B60B 3/142 |
| 10,184,508 | B2 * | 1/2019 | Limatoc | F16B 39/026 |
| 11,938,754 | B2 * | 3/2024 | Lucà | B60B 3/165 |

FOREIGN PATENT DOCUMENTS

| | | | | |
|---|---|---|---|---|
| DE | 102020116752 A1 * | 12/2021 | ........ | B60B 27/0042 |
| EP | 2602123 A1 | 6/2013 | | |
| EP | 3909784 A1 | 11/2021 | | |

OTHER PUBLICATIONS

Written Opinion and Search Report from the Italian Patent Office completed Apr. 24, 2023 in related application No. IT 202200023265, and partial translation thereof.

* cited by examiner

*Primary Examiner* — Josh Skroupa
(74) *Attorney, Agent, or Firm* — J-TEK LAW PLLC; Scott T. Wakeman; Mark A. Ussai

(57) ABSTRACT

A hub bearing unit includes a radially outwardly extending flange, a first portion on a first side of the flange and a tubular portion on a second side of the flange. A bearing outer ring surrounds the first portion, and rolling elements are mounted between the first portion and the outer ring. A splined shaft of a constant velocity joint extends into the hub and has a threaded end portion inside the tubular portion. A threaded connector is mounted on the threaded end portion and has a deformable portion configured to be deformed to prevent the threaded connector from being unscrewed. A portion of the tubular portion near the flange includes a radial through hole configured to allow a torque arm of a deformation tool to access and deform the deformable portion.

10 Claims, 3 Drawing Sheets

(52) U.S. Cl.
CPC .......... *B60B 27/0094* (2013.01); *B60B 3/142*
(2013.01); *B60B 2380/12* (2013.01); *F16C*
*2326/02* (2013.01)

(58) Field of Classification Search
USPC ................................ 464/178, 904, 905, 906
See application file for complete search history.

INTEGRATED HUB BEARING UNIT

CROSS-REFERENCE

This application claims priority to Italian patent application no. 102022000023265 filed on Nov. 11, 2022, the contents of which are fully incorporated herein by reference.

TECHNOLOGICAL FIELD

The present disclosure is directed to an integrated hub bearing unit for the wheel of a motor vehicle and more specifically to an integrated bearing unit for the wheel hub of a motor vehicle configured to accommodate a deformation tool used during the assembly of the hub bearing unit.

BACKGROUND

Such assemblies comprise a hub with a flange directed radially outward from one axial end thereof for mounting a vehicle wheel, an outer ring with axially spaced raceways, and a plurality of rolling elements in the annular space between the outer ring and the hub. The rolling elements are arranged in two rows: an axially outer row in an annular space between the outer ring and the hub and an axially inner row in an annular space between the outer ring and an inner ring keyed on the hub.

The radial flange of the hub has a number of holes to allow mounting of the vehicle wheel by means of bolts. The flange also has a flat radial surface on its axially external side that defines a precise reference surface against which the brake disc and the wheel are supported.

The hub further includes a tubular portion which projects in an axially outward direction beyond the radial flange. This tubular portion serves to allow the support and preliminary centering of the wheel, before it is fixed, in a perfectly centered position, by means of the fixing bolts that are inserted through the holes in the flange.

Inside the protruding tubular portion there is a thread in which a single central threaded fixing element can be screwed to lock the wheel on the hub.

In the case of application to a drive wheel, the hub is angularly coupled to a constant velocity joint, the shaft of which is axially locked to the hub by means of a threaded nut which is screwed onto a protruding threaded end of the joint shaft and abuts against a radial surface of the hub.

The threaded nut is secured against accidental unscrewing by means of a crunch, that is, a plastic deformation of one of its axial ends on the shaft of the constant velocity joint. The crunching process is performed using special equipment.

In the case of sports applications, the tubular portion of the hub that protrudes in an axially external direction has a remarkable axial dimension and is very close to the shaft of the constant velocity joint. This makes the crunch machining of the threaded nut very difficult as the same nut will be in a corresponding recess with respect to the axial end of the tubular portion of the hub.

For the same reason, moreover, it is almost impossible to carry out a visual inspection that checks the correctness of the crunching process.

SUMMARY

An aspect of the present disclosure is to provide an integrated hub bearing unit for the wheel of a motor vehicle which is free from the drawbacks described above.

According to the present disclosure, a hub bearing unit for a wheel of a motor vehicle comprises a hub having a first axial end, a second axial end spaced from the first end in an axial direction, a radially outwardly extending flange at a location between the first axial end and the second axial end, an axial opening extending from the first axial end to the second axial end and a tubular portion extending from the radial flange toward the second axial end, the tubular portion including a proximal cylindrical centering portion at the flange. A bearing outer ring surrounds a portion of the hub between the flange and the first axial end of the hub and includes an outer ring including a first raceway and a second raceway, the hub bearing unit also includes a bearing inner ring mounted on the portion of the hub. A first row of rolling elements is mounted between the first raceway of the outer ring and a raceway formed on an outer surface of the portion of the hub and a second row of rolling elements is mounted between the second raceway of the outer ring and a raceway of the bearing inner ring. A splined shaft of a constant velocity joint extends into the axial opening from the first axial end of the hub to a location inside the tubular portion of the hub, and the splined shaft has a threaded end portion inside the tubular portion of the hub. A threaded connector is threadedly engaged with the threaded end portion of the splined shaft and has a deformable portion configured to be deformed relative to the splined shaft to prevent the threaded connector from being unscrewed from the splined shaft. The proximal cylindrical centering portion of the tubular portion includes at least one radial through hole radially aligned with the deformable portion of the threaded connector and configured to allow a torque arm of a deformation tool to access the deformable portion, and a surface of the through hole closest to the second axial end of the hub is configured to absorb forces applied thereto by the torque arm during a deformation of the deformable portion.

BRIEF DESCRIPTION OF THE DRAWINGS

Embodiments of the invention will now be described with reference to the attached drawings, in which.

DETAILED DESCRIPTION

Figure 1:
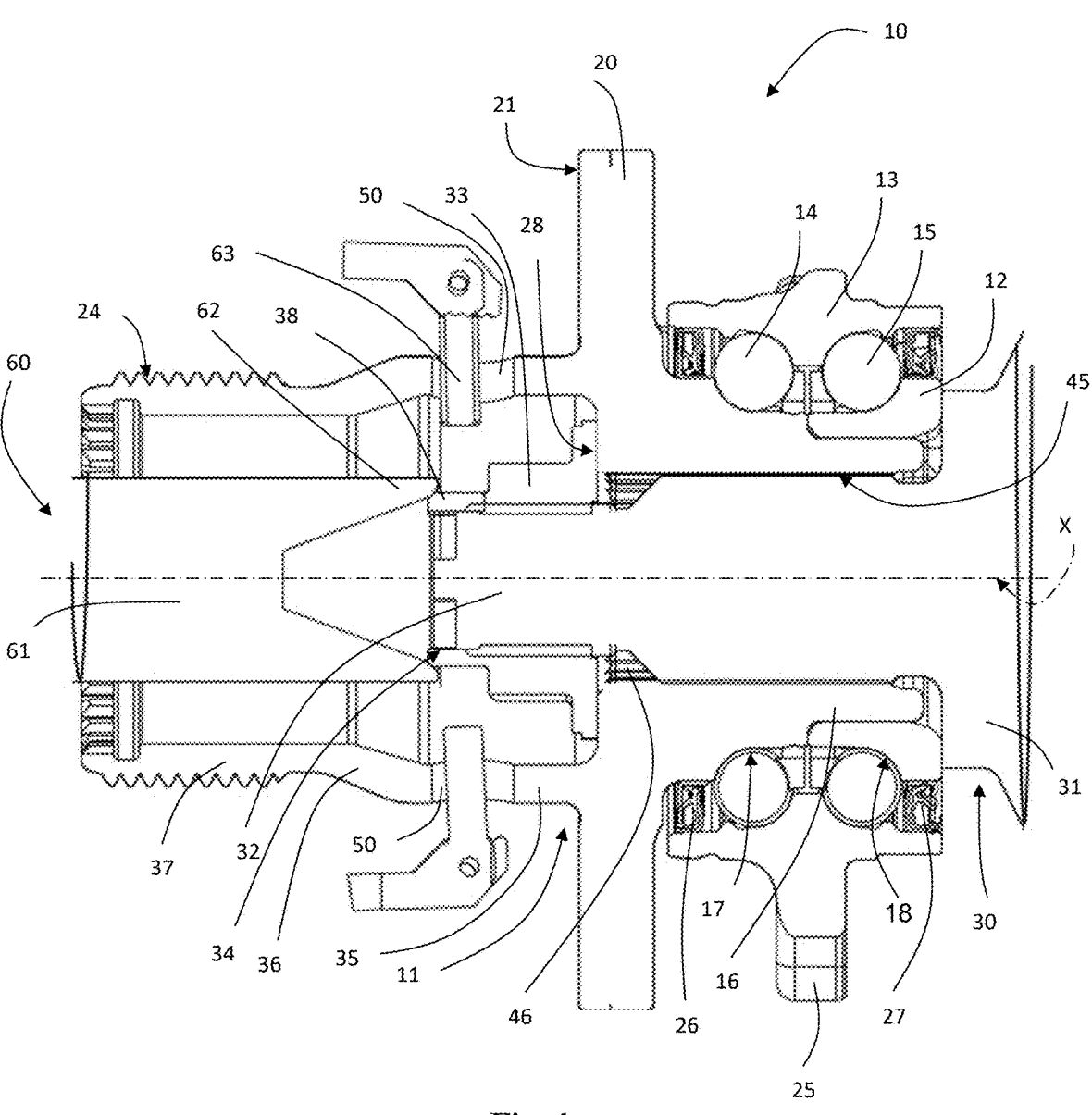
FIG. 1 is a sectional side elevational view of a preferred embodiment of an integrated hub bearing unit according to an embodiment of the present disclosure.

With reference to FIG. 1, a flanged hub bearing unit according to a preferred embodiment of the disclosure is indicated as a whole with 10. The unit 10 serves to rotatably mount a wheel (not shown) to an upright (not shown) of the suspension of a vehicle, around a central axis of rotation X. Throughout this description and in the claims, terms and expressions indicating positions and directions such as "radial" and "axial" are to be understood as referring to the axis of rotation X of the bearing. Expressions such as "axially internal" and "axially external", on the other hand, refer to the vehicle mounted condition with the "axially internal" direction being toward the right in FIG. 1.

The hub bearing unit includes a hub 11 on which is fixed a radially inner ring 12 which forms one of the raceways of the unit, a radially outer ring 13 and two rows of rolling elements 14, 15, in this example balls, arranged in two rows axially spaced in the annular space between the radially outer ring 13 and the hub 11.

The hub 11 comprises a radially internal tubular body 16, that integrally forms a radially internal raceway 17 for the row of balls 14 arranged on the axially external side (or "outboard" side) of the hub 11. The radially inner ring 12 is keyed on the tubular body 16 and forms a radially internal raceway 18 for the row of balls 15 arranged on the axially internal side (or "inboard" side) of the hub. The radially outer ring 13 has, in a known manner, a radially external flange 25 fixable to the vehicle suspension upright. Two traditional sealing devices 26, 27, in this example of the cassette type, are provided at the opposite axial ends of the radially outer ring 13, one on the outboard side between the radially outer ring 13 and the hub 11, and the other on the inboard side between the radially outer ring 13 and the radially inner ring 12.

The tubular body 16 is angularly coupled to a constant velocity joint 30 provided with a bell 31 and a splined shaft 32. The shaft 32 is inserted directly through the tubular body 16, in a cylindrical cavity 45 with axial grooves 46. The shaft 32 is angularly coupled to the tubular body 16 by way of an external groove to transmit a driving torque from the constant velocity joint 30 to the hub 11. The shaft 32 is axially locked to the hub 11 by a threaded connector 33, in this case a threaded nut 33 which screws onto a protruding threaded end 34 of the shaft 32 and abuts against a radial surface 28 of the hub. The threaded nut 33 tightens the bell 31 against the radially inner ring 12 and also determines a preload to the hub bearing unit 10. The threaded nut 33 is also provided with an axially external end portion 38, which, as explained below, it is pressed onto the shaft 32 to prevent the nut from loosening or becoming unscrewed.

The hub 11 forms a flange 20 which extends radially outwards and has a flat radial surface 21, from the axially external side, which defines a flat and precise radial reference surface, against which the brake disc and the wheel (not shown) are supported.

The wheel is fixed to the hub by means of an axially extended tubular portion 19 which projects in an axially outward direction beyond the radial flange 20.

The tubular portion 19 of the hub comprises a proximal cylindrical centering portion 35 connected directly to the flange 20 and provided with at least one through hole 50, the function of which will be described below; a conical portion 36, which is connected to the centering portion 35 and tapers in a direction away from the centering portion 35; and a distal portion 37 having an external thread 24 onto which a single central threaded fixing element (not shown) can be screwed, the threaded fixing element being suitable for locking the wheel on the hub.

During the assembly process of the constant velocity joint 30, as already mentioned, the threaded nut 33 axially blocks the joint itself with respect to the hub 11. The threaded nut 33 is tightened with a specified torque and, in addition, its resistance to unscrewing is ensured by deforming, that is, crunching its end portion 38 into the grooves present in the shaft 32 of the constant velocity joint 30.

To carry out the crunching process, a tool 60 is used, represented only partially in FIG. 1. Basically, the tool 60 is provided with a punch 61, having a terminal portion 62 which causes the deformation of the terminal portion 38 of the threaded nut 33, and of at least one torque arm 63 which must discharge the force exchanged between the punch 61 and the nut 33.

According to the present disclosure, to facilitate the deformation process of the terminal portion 38 of the threaded nut 33 and to allow an adequate visual inspection for the control of the same process, at least one through hole 50 has been created in the proximal portion 35 of the tubular portion 19. This hole must allow the insertion inside it of the torque arm 63 of the tool 60. In this way, it is possible to use higher crunching forces than in known processes, since the torque arm 63 will transmit the forces on the axially external surface of the through hole 50. This area, being on the tubular portion 19 of the hub 11, is very distant from the critical areas of the hub 11 and of the rings 12, 13 of the unit 10 and, therefore, can absorb a greater force.

The deformation of the end portion 38 of the threaded nut 33 by the tool 60 therefore provides a strong additional locking of the nut 33 itself on the shaft 32 of the constant velocity joint 30. In this way, the threaded nut 33 is firmly retained during all the operating conditions, even extreme ones, in order to avoid any risk of its loosening.

Preferably, as in the embodiment illustrated in FIG. 1, the through holes 50 are two in number and angularly spaced 180° from each other. In fact, the presence of two holes allows the use of a tool equipped with two torque arms. By operating in this way, the safety of the process increases and a balance of the reaction forces is obtained during the locking of the punch on the threaded nut. A greater number of through holes would not give further advantages from the point of view of the crunching process, on the contrary it would risk weakening the structural strength of the tubular portion 19.

Figure 2:
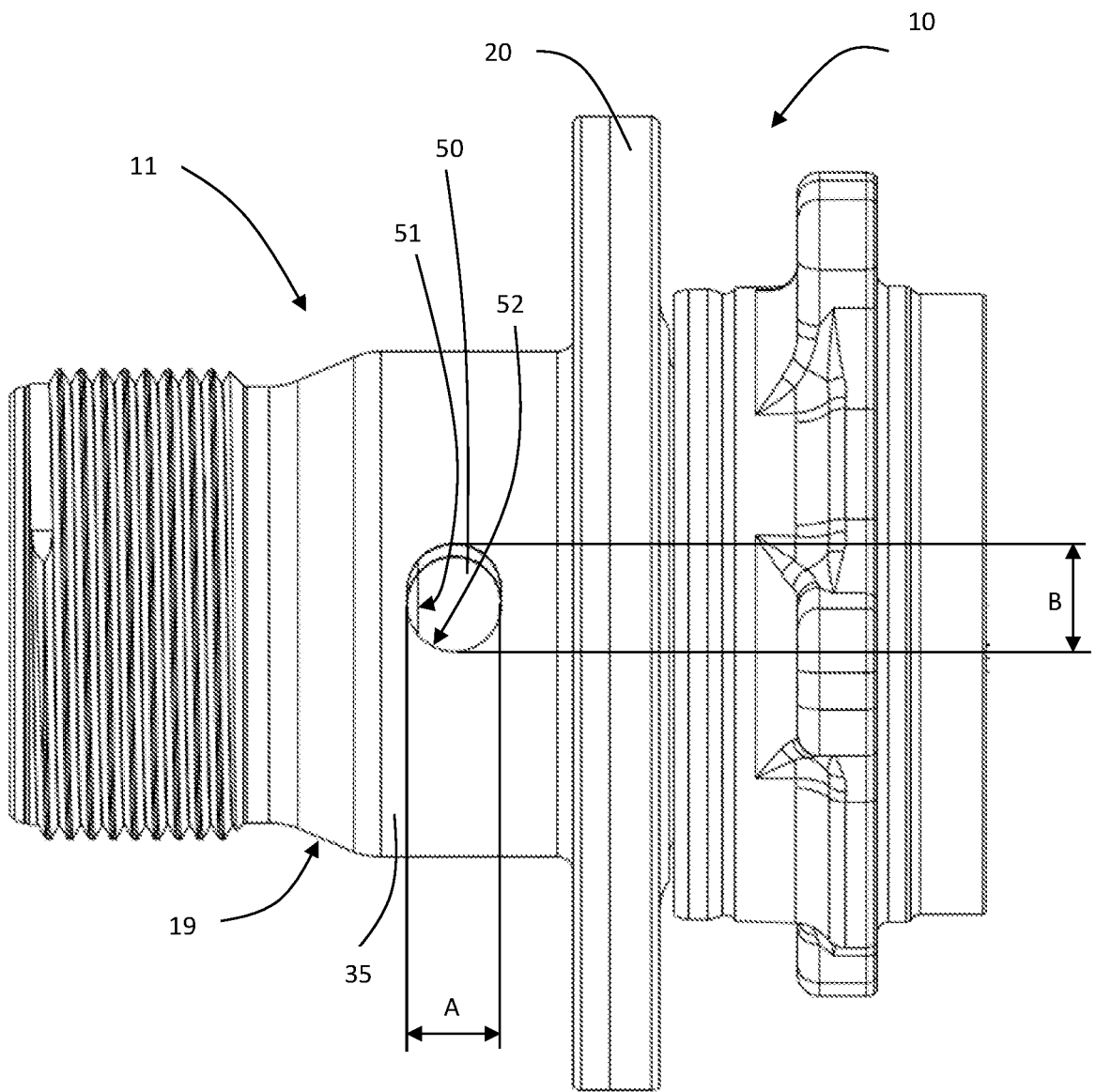
FIG. 2 is a side elevational view of the integrated hub bearing unit of FIG. 1.

With reference also to FIG. 2, the through hole (preferably the two 180° through holes) accommodates the torque arm 63 (preferably two torque arms) of the tool to improve the crunching process and therefore prevent the unscrewing of the threaded nut 33. The reaction takes place on the axially outer surface 51 of the through hole 50. Preferably, the axially outer surface 51 is a flat surface, parallel to the surface 21 of the flange 20 of the hub 11, as well as in the embodiment shown in FIG. 2. In this way, the torque arm 63 of the tool 60 can have a large resting surface inside the through hole 50. Advantageously, the axially outer surface 51 and the remaining cylindrical surface 52 are connected together and the transition takes place without the generation of points of discontinuity, in order to avoid areas of concentration of stresses.

The through hole 50 can have any type of cross section. By way of example only, the section may be: a circle, a circular segment (whose base generates the axially outer surface 51), a slot, a square, etc. In other words, the section of the through hole of the tubular portion 19 can be completely generic, as long as it ensures a good support surface for the torque arm 63 of the crunching tool 60.

Figure 3:
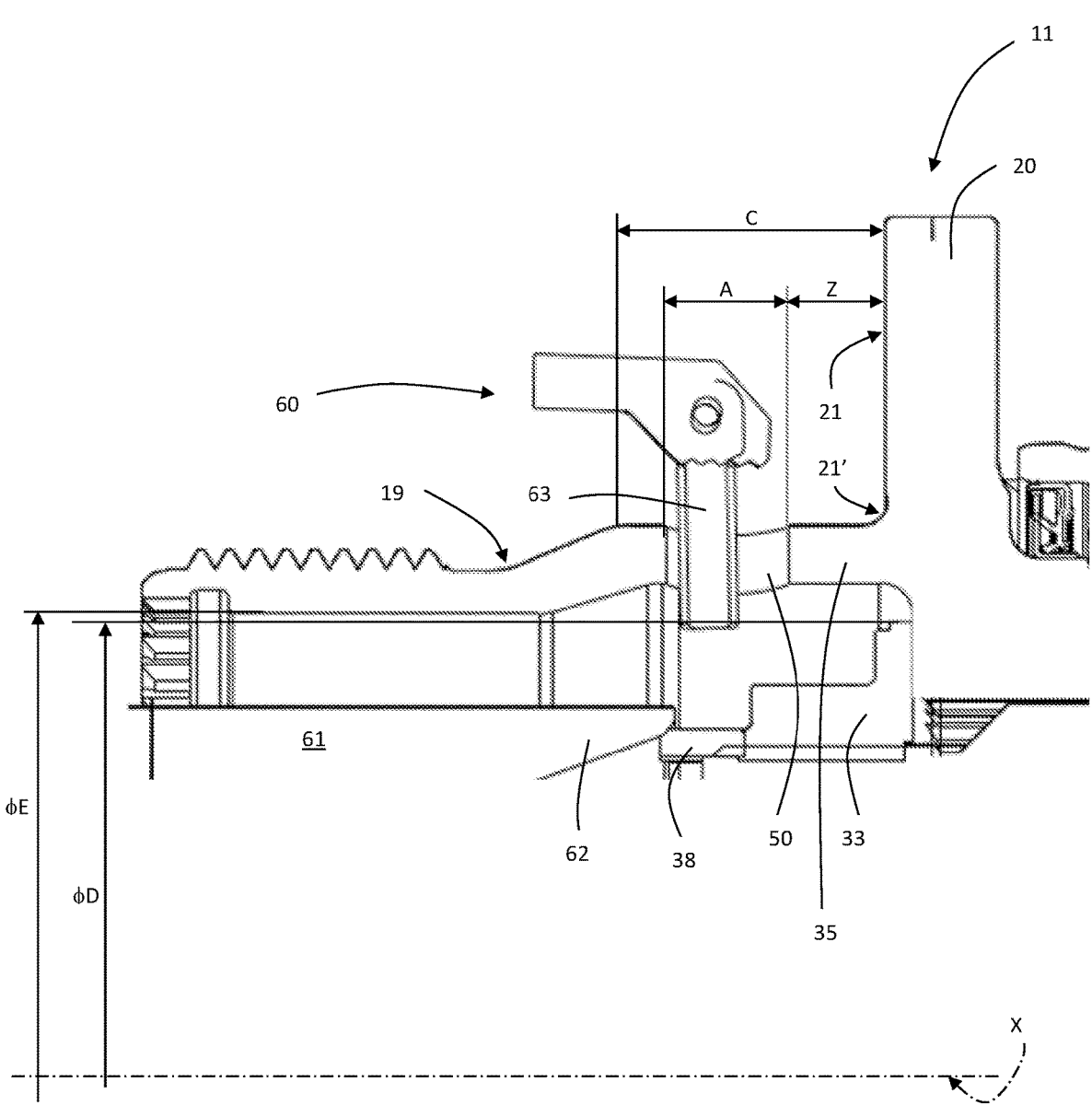
FIG. 3 is a detail view of a portion of the integrated hub bearing unit of FIG. 1.

With reference also to FIG. 3, the axial length A of the through hole 50 depends on the application, i.e., the mounting diameter of the wheel on the hub. Furthermore, for considerations related to the structural strength of the tubular portion 19, the axial length A of the through hole 50 should not exceed half the axial length C of the proximal portion 35 of the tubular portion 19 of the hub 11. Finally, to have a good access of the torque arm 63 of the tool 60 inside the through hole 50 the axial length C of the proximal portion 35 should be between 10 mm and 50 mm or, if preferred, the axial length A of the through hole 50 should be between 5 mm and 25 mm.

Furthermore, the axial distance Z of the through hole 50 from the surface 21 of the flange 20 should be greater than 2 mm, in order to prevent the through hole 50 from interfering with the fitting 21' of the flange 20 with respect to the tubular portion 19 of the hub 11.

The length B of the through hole 50 in the circumferential direction will be equal to the axial length A in the case of a circular hole, or it will be greater than A in the case of a slot. The length B will in any case be limited to a maximum value equal to B=2×A, again to ensure adequate structural strength of the tubular portion 19.

Furthermore, in order to be able to easily mount the threaded nut 33 inside the tubular portion 19 of the hub 11, the external diameter D of the threaded nut 33 must always be smaller than the radially internal diameter E of the tubular portion 19.

The main advantages achieved with the present disclosure can be summarized as follows:

the through hole allows a tool to access the threaded nut inside the tubular portion;

the reaction force of the crunching process is transmitted on a less delicate area of the hub bearing unit; therefore, the crunching process can be more energetic and, therefore, the implementation of the resistance to unscrewing of the nut is excellent;

the through hole also allows an excellent visual inspection and, therefore, a control of the implementation of the unscrewing resistance function; and the through hole also reduces the mass of the hub bearing unit without affecting the required performance.

In addition to the embodiment described above, it is to be understood that numerous other variants exist. It is also to be understood that such embodiments are exemplary only and limit neither the scope of the invention, nor its applications, nor its possible configurations. On the contrary, although the above description allows the skilled person to carry out the present invention at least according to an exemplary embodiment thereof, it must be understood that many variants of the components described are possible, without thereby departing from the scope of the invention, as defined in the attached claims, which are interpreted literally and/or according to their legal equivalents.

What is claimed is:

1. A hub bearing unit for a wheel of a motor vehicle, the hub bearing unit comprising:

a hub having a first axial end, a second axial end spaced from the first end in an axial direction, a radially outwardly extending flange at a location between the first axial end and the second axial end, an axial opening extending from the first axial end to the second axial end and a tubular portion extending from the radial flange toward the second axial end, the tubular portion including a proximal cylindrical centering portion at the flange;

a bearing outer ring surrounding a portion of the hub between the flange and the first axial end of the hub, the bearing outer ring including a first raceway and a second raceway, a bearing inner ring mounted on the portion of the hub, a first row of rolling elements mounted between the first raceway of the outer ring and a raceway formed on an outer surface of the portion of the hub and a second row of rolling elements mounted between the second raceway of the outer ring and a raceway of the bearing inner ring, a splined shaft of a constant velocity joint extending into the axial opening from the first axial end of the hub to a location inside the tubular portion of the hub, the splined shaft having a threaded end portion inside the tubular portion of the hub, and a threaded connector threadedly engaged with the threaded end portion of the splined shaft and having a deformable portion configured to be deformed relative to the splined shaft to prevent the threaded connector from being unscrewed from the splined shaft, wherein the proximal portion of the tubular portion includes at least one radial through hole radially aligned with the deformable portion of the threaded connector and configured to allow a torque arm of a deformation tool to access the deformable portion, and wherein a surface of the through hole closest to the second axial end of the hub is configured to absorb forces applied to the surface of the through hole by the torque arm during a deformation of the deformable portion.

2. The hub bearing unit according to claim 1, wherein the surface of the through hole is a flat surface parallel to an axially outer surface of the flange.

3. The hub bearing unit according to claim 2, wherein the at least one through hole comprises two diametrically opposed through holes.

4. The hub bearing unit according to any of the claim 2, wherein a length of the at least one through hole in the axial direction is less than or equal to half of an axial length of the proximal cylindrical centering portion of the tubular portion.

5. The hub bearing unit according to claim 4, an axial distance from the at least one through hole to a surface of the radial flange facing the second axial end of the hub is greater than 2 mm.

6. The hub bearing unit according to claim 5, wherein a circumferential width of the at least one through hole is less than or equal to twice the length of the at least one through hole in the axial direction.

7. The hub bearing unit according to claim 1, wherein the at least one through hole has a straight section in a shape of a circular segment, the base of which generates the surface.

8. The hub bearing unit according to claim 7, wherein a portion of the through hole that does not form the surface is cylindrical.

9. The hub bearing unit according to claim 1, wherein the at least one through hole has a straight section in a shape of a circle, a slot or a square.

10. The hub bearing unit according to claim 1, wherein the threaded connector is a nut.

* * * * *